United States Patent [19]
Marx

[11] Patent Number: 5,482,689
[45] Date of Patent: Jan. 9, 1996

[54] PROCESS FOR THE ACCELERATED PRODUCTION OF RED LEAD OXIDE

[75] Inventor: Reinhard Marx, Bad Harzburg, Germany

[73] Assignee: Heubach & Lindgens GmbH & Co. KG., Germany

[21] Appl. No.: 655,450

[22] PCT Filed: Jul. 6, 1990

[86] PCT No.: PCT/EP90/01094
§ 371 Date: Mar. 5, 1991
§ 102(e) Date: Mar. 5, 1991

[87] PCT Pub. No.: WO91/00848
PCT Pub. Date: Jan. 24, 1991

[30] Foreign Application Priority Data

Jul. 10, 1989 [DE] Germany .................. 39 22 654.9

[51] Int. Cl.$^6$ ............................................ C01G 21/02
[52] U.S. Cl. ................. 423/619; 422/203; 422/225
[58] Field of Search ............................. 423/619, DIG. 6, 423/659; 422/203, 225

[56] References Cited

U.S. PATENT DOCUMENTS

| | | | |
|---|---|---|---|
| 1,452,594 | 4/1923 | Claude | 422/203 |
| 1,888,066 | 11/1932 | Bond | 423/DIG. 6 |
| 2,840,355 | 6/1958 | Stratford | 422/225 |
| 3,450,503 | 6/1969 | Knorr . | |
| 3,836,339 | 9/1974 | Lesbros et al. | 422/225 |
| 4,618,478 | 10/1986 | McKinney | 422/225 |
| 4,670,225 | 6/1987 | Fayard et al. | 422/203 |

FOREIGN PATENT DOCUMENTS

| | | | |
|---|---|---|---|
| 315139 | 12/1988 | Japan . | |
| 559994 | 3/1944 | United Kingdom . | |
| 1400885 | 7/1975 | United Kingdom | 423/619 |

OTHER PUBLICATIONS

*Chemical Abstracts* 54:21671 (h) (1960).

Primary Examiner—Wayne Langel
Attorney, Agent, or Firm—Venable, Baetjer, Howard & Civiletti

[57] ABSTRACT

This invention relates to a process for the accelerated production of red lead oxide, the lead oxide to be oxidized being kept in suspension like a fluidized bed, particularly being kept in suspension like a fluidized bed in a stirrer reactor by a stirrer, only part of the finished product being drawn off from the fully oxidized fluidized bed and being replaced by new lead oxide to be oxidized, as well as an apparatus therefor.

11 Claims, 1 Drawing Sheet

PROCESS FOR THE ACCELERATED PRODUCTION OF RED LEAD OXIDE

FIELD OF THE INVENTION

The chemical basic reaction, on the basis of which red lead oxide is produced thermally on an industrial scale, reads $$6\ PbO + O_2 \rightleftarrows 2\ Pb_3O_4.$$

In contrast to the direct oxidation of metallic lead to form divalent oxide, this reaction proceeds rather slowly, so that diffusion processes in the solid matter are assumed to be rate-determining reaction steps. This is also borne out by the fact that the supplied oxide modification exerts a marked influence.

The long reaction times in the batch furnaces usually used were therefore frequently accepted as being a matter of course, although there was no lack of tests serving to improve the red lead oxide process:

It follows readily from the above-defined reaction equation that the reaction rate has to be proportional, among others, to the partial pressure of oxygen. Since the reaction proceeds slightly exothermally, the reverse reaction becomes increasingly stronger with rising temperature; however, the decomposition point for the red lead oxide may also be raised by increasing the partial pressure of oxygen in the ambient atmosphere, all other steps influencing the reaction being, of course, accelerated as well.

On the basis of these considerations various processes were developed in which either pure oxygen is supplied to the reaction instead of air or the process is carried out under increased total pressure, as shown e.g. by L. Holub, Bleioxide in der Vergangenheit und Gegenwart, Chemické Listy 94 (1970), 10, pages 1009–1031, IT-PS 485,215 and DE-PS 633,620 and 590,481. Unfortunately, these references do not give any values showing the reaction rate and the energy consumption. It also seems that the corresponding processes have hardly gained ground in practice, although they were developed as early as around 1930.

Attempts were also made to accelerate the formation of red lead oxide by improving the contact between solid bulk material and atmosphere.

In this connection, reference is made particularly to DE-PS 633,620 where sand is added as a loosening agent and to ES-PS 238,670 in which the reaction is carried out in a ball mill. Also, these processes could not be introduced convincingly on an industrial scale, since the increased technical expenditure could obviously not be compensated by any sufficient different advantages.

In principle, the process described in IT-PS 485,215, in which an intimate contact is achieved between lead and oxygen by evaporating the lead, has to be counted among the latter processes as well. In this case, it was certainly due to the higher energy consumption that the otherwise very interesting process did not become common.

It follows from C.A., Vol. 54 (1960), No. 21671 h, that the oxidation of PbO to form $Pb_3O_4$ is determined in the fluidized bed by the diffusion of oxygen and that a temperature increase to 560° C. and an increase of the oxygen pressure to 1 atm could raise the reaction rate to 2½ times its rate by a corresponding increase in the diffusion rate.

GB-PS 559,994 shows a reactor for red lead oxide, in which the lead oxide is kept in motion by a perpendicular stirrer and the preferably pre-heated oxidizing gases are fed into the reactor from below, so that they do not only chemically react with the material throughout their way up to the surface but also contribute to the fact that the temperature of the material is kept at a constant level. In this way, the oxidizing gases can also be supplied under pressure, which has a notable effect on the reaction rate. However, this is a batch reaction, a conversion into a material having 90% of $Pb_3O_4$ taking 8 hours for a batch at approximately 480° C. Formerly this took 20 to 30 hours.

U.S. Pat. No. 3,450,503 shows a process for the production of litharge which can be oxidized into red lead oxide in a second process step. The litharge is produced by spraying molten lead in a zone of high gas turbulence and oxidizing it with air or air enriched with oxygen, which may also be supplied at excess pressure, to form litharge. The finely dispersed PbO produced according to this process, which is known as the "Goldschmidt" process, can then be oxidized in a multi-deck oven to form highly disperse red lead oxide. Thus, the oxidation of lead which virtually proceeds in the fluidized bed, does not result in red lead oxide in one step, and the litharge is oxidized to form red lead oxide as usual.

SUMMARY OF THE INVENTION

The object of the present invention is to considerably reduce the reaction time of oxidizing PbO to form $Pb_3O_4$ as compared to known processes and to obtain at least the same red lead oxide quality, expressed in % of $PbO_2$, for example.

DETAILED DESCRIPTION OF THE INVENTION

Figure 1:
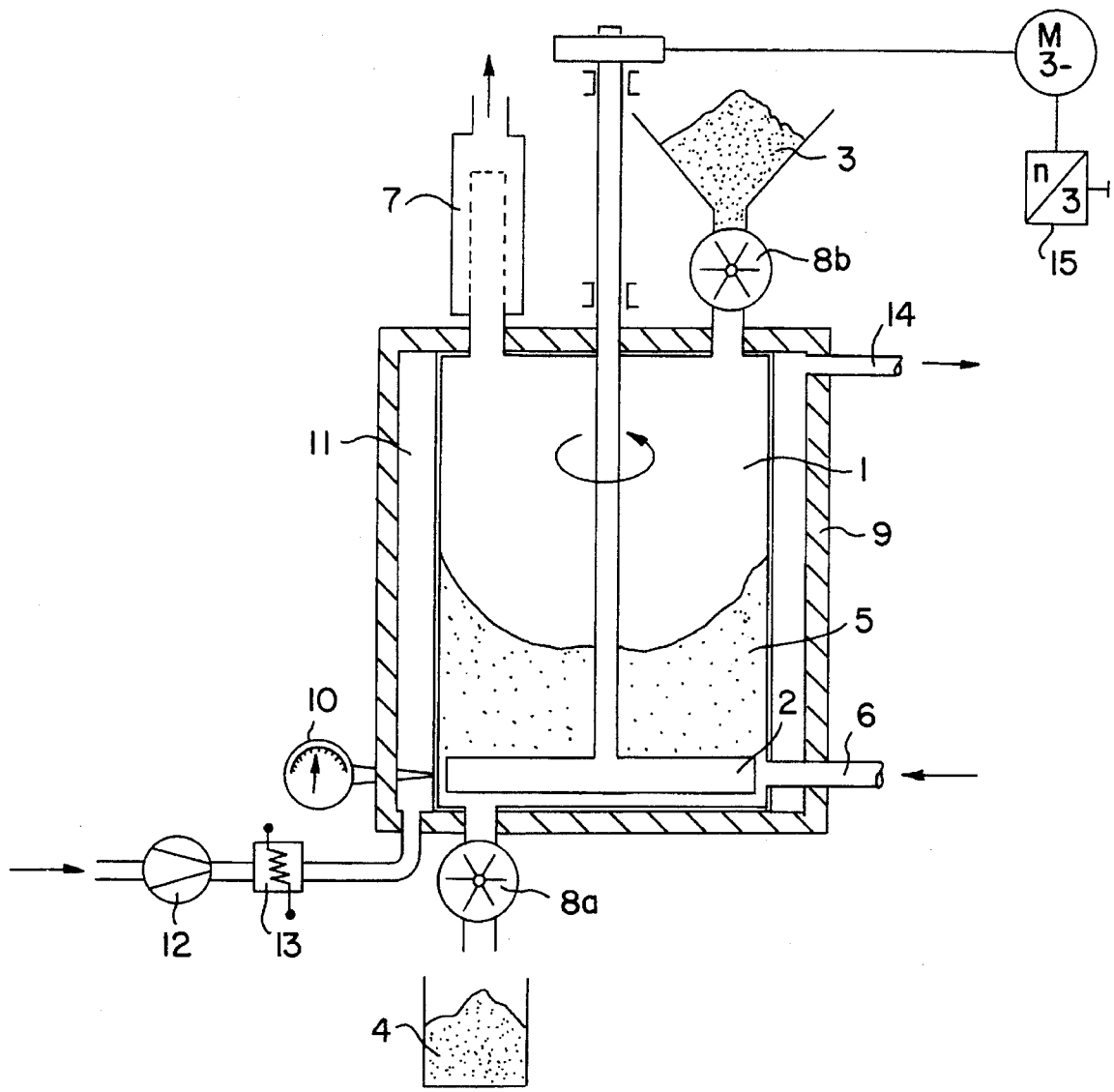
FIG. 1 shows a reactor apparatus for carrying out the accelerated production of red lead oxide.

In developments made by the inventor in the field of lead oxidation it has now been found that the oxidation rate will be particularly high if the reaction takes place in a fluidized bed under certain conditions. It has been confirmed that in all of these known technical processes—an exception being perhaps IT-PS 485,215 and GB-PS 559,994—a substantial reaction delay results from the fact that the oxygen is consumed within the solid bed and cannot diffuse again rapidly enough, so that a very minor partial pressure does actually exist at the particle surface. In that by means of a stirrer the lead oxide to be oxidized is kept in suspension in a stirrer reactor like a fluidized bed, the disadvantages of the former processes may be avoided. At the same time, however, in this case it is essential that the amount of litharge to be oxidized per unit time is controlled in a suitable manner.

The object of the invention to produce red lead oxide at a considerably higher rate than formerly possible is solved correspondingly in that the lead oxide to be oxidized is provided with sufficient oxygen at the particle surface by drawing off only part of the finished product from the fully fluidized bed at a time and replacing it by new lead oxide to be oxidized.

The production of a fluidized bed is the simplest possibility of eliminating the above-mentioned, fundamental drawback of oxygen shortage within the solid bed. It proved to be particularly advantageous to maintain the fluidized bed in a stirrer reactor by means of a vigorous stirrer, since this prevents the reaction products from forming agglomerations. However, if always the entire fully oxidized process product is taken and replaced by new litharge, considerably higher reaction times will surprisingly result, calculated for the total production, as if only part of the finished product is drawn off and replaced by new litharge to be oxidized. Preferably, a quarter to half of the reactor contents of the fully oxidized reaction product are drawn off and replaced by a new starting material (PbO).

In this way the process time is considerably reduced and thus the costs are essentially lowered, which also results in that a substantially smaller reactor can be used for the same throughput, which is, of course, accompanied by considerably reduced costs.

In addition, the process according to the invention which is based upon the above findings enables to use the expended mechanical stirring energy for keeping the fluidized bed at reaction temperature. In all other processes for the production of red lead oxide, the apparatus has to be constantly heated because it cannot be insulated to a sufficient extent; reaction enthalpy and frictional heats are lost. However, in the reactor according to the invention it might even be necessary to cool the reaction at certain intervals, which is a major advantage from a control-engineering point of view.

Hereinafter, it is to be explained by means of the drawing how to carry out the process according to the invention:

A fluidized bed 5 is maintained in the reaction vessel 1 by the stirrer 2, which in the initial operation of the reactor consists of the finished product 4 which is initially supplied. Hot air is blown into the reactor jacket 11 via the air heater 13 by means of the blower 12. In this way, heating-up of the fluidized bed, which is also possible without hot air, is accelerated. While heating up, air and/or oxygen is already supplied via the gas supply tube 6, and the desired atmosphere is adjusted. Having reached the reaction temperature which is measured by the thermocouple 10, the heated, supplied finished product is partially removed via star feeder 8a. For reasons of productivity, it is useful to discharge not less than 25% and for thermal reasons it is useful to discharge not more than 50% of the fluidized bed amount. About 35 to 45% are preferred. The starting material 3 is charged directly after that via its star feeder 8b in the same amount as finished product was discharged. As a result, the fluidized bed 5 maintains its mass and the drive motor of the stirrer 2 retains its intended load.

Although the temperature of the fluidized bed drops precipitously by up to 100° C. due to the supply of the cold starting material, it increases rapidly, within 5 to 10 min, to the given value again, which is in the range of about 500° C., due to exothermal reaction enthalpy. The reaction vessel charge has now to be adjusted such that the stirring energy and the gradually decreasing reaction enthalpy result in a further temperature increase. However, this may only take place until a certain nominal temperature has been reached which is between 470° and 520° C., preferably at about 500° C. A further increase is avoided in that the excessive heat is dissipated by cooling air blown through the jacket 11 by the blower 12. A controller takes care that the nominal temperature varies by only few degrees in the further course of the batch. Along with the desired oxidation degree the batch period now also depends on various other parameters, such as the quality of the starting material and the gas composition, i.e. the oxygen content of the gas blown in. The oxygen content may vary and/or be adjusted between 21 and 100%. Thus, air can also be used. The batch period has to be determined by means of experiments,, which can be done by few tests. As soon as the determined period has elapsed, part of the finished product is drawn off as in the described initial operation and the corresponding amount of starting material is charged. The cycles can be continued for any period of time. In conclusion it is emphasized that the air heater 13 has only to be switched on for the initial operation and possible breakdowns. Since only part of the finished product is drawn off and thus only part of the starting material is charged, no external heating is necessary in this stage of operation because, as mentioned above, the temperature rises very quickly to the given value again.

From the description of the process course it can easily be perceived that automation creates no difficulties. The stirring speed is such that a fluidized bed-like condition is always maintained, however it can also be automatically adjusted faster or slower, depending on whether a temperature increase or a constant temperature is desired, if only the fluidized bed is maintained. In an industrial apparatus having e.g. 1400 mm in diameter, stirring speeds of 150 to 200 rotations per minute, particularly 150 to 180 rotations per minute, are suitable, while a stirrer speed of about 360 rotations per minute is necessary for a pilot reactor having a diameter of 400 mm to obtain about the same peripheral speed.

Following this fundamental explanation of the process, the advantages which can be obtained over conventional processes are shown below by means of practical results.

100 kg of red lead oxide having 30% of $PbO_2$ were supplied to a reactor vessel having a diameter of 400 mm and heated to 500° C., 35 l of oxygen being added per minute. After reaching the nominal temperature of about 500° C., 40 kg of red lead oxide were drawn off and 40 kg of lead(II) oxide were charged immediately after that. After 20 min, the fluidized bed again reached the initial content of 30% of $PbO_2$. The stirrer rotated at 360 rotations per minute and had a power input of little less than 8 kW, so that the following data result:

| | |
|---|---|
| 120 kg/h | production capacity |
| 66 kWh/t | energy consumption |
| 25 kg/t | oxygen consumption |
| 1.2 | oxygen excess (lambda) |
| 20 min | batch period. |

If oxygen is replaced by air in this process, the batch period will increase considerably, or a reduced oxidation degree is achieved when the period remains the same; 23% of $PbO_2$ in the given example. Although the process can also be operated with air, it is more advantageous to use oxygen. This is due to a practical problem, i.e. the filtration of the considerably higher amounts of hot exhaust gas.

In any case, the atmosphere in the fluidized bed is adjusted to a desired oxygen potential by a selective gas supply. The easiest way for this is to adjust the oxygen content of the supplied gas but also to vary the pressure instead or in addition.

For comparison it is stated that for conventional processes the use of air requires batch times of 10 to 15 h. The shortest oxidation period determined so far is mentioned in DE-PS 633,620, which is 3 hours in an oxygen atmosphere and 1 bar pressure above atmospheric. These values elucidate the advantage of the process according to the invention. The red lead oxide used in the example and containing 30% of $PbO_2$, which corresponds to about 86% of $Pb_3O_4$, is of common quality. 33.5% of PbO would correspond to about 96% of $Pb_3O_4$, which when oxygen is used can be achieved in the same procedure within a batch period of about 40 minutes.

Red lead oxide produced according to the process of this invention will only have to be ground if made for paint purposes. For use in glass, ceramics and battery industries the degree of fineness is already sufficient, since it is not of particular importance for these applications.

The present invention also relates to the apparatus for carrying out this process, as illustrated in the enclosed drawing and described in connection with the process.

This apparatus consisting of the reaction vessel 1 comprising stirrer 2, gas supply 6 and gas outlet 7 for the oxidation gas as well as star feeders 8a 8b for the supply of raw material and the discharge of the finished product in a device 10 for measuring the internal temperature, is characterized in that the reactor 1 is sheathed with a good insulation 9 on all sides and has a cavity for an air jacket 11 around the reactor, this air jacket having an air supply line and an air discharge line 14, and a blower 12 and an electric air heater 13 being arranged in the air supply line.

According to a preferred embodiment, the speed of the stirrer 2 is automatically controlled by the diagrammatically illustrated device 15 within given limits as a function of the nominal temperature in the reactor, the limits being such that a fluidized bed is still maintained at the lower limit of revolutions and no notable erosion of the reactor occurs at the upper limit of the stirring speed.

According to another preferred embodiment, the heating or cooling of the air jacket 11 is also automatically controlled via the blower 12 to maintain a previously adjusted temperature or to heat up the reactor via the air jacket 11 within a certain period in addition to the reaction heat.

I claim:

1. A process for the accelerated production of $Pb_3O_4$, which comprises oxidizing PbO in a stirrer reactor, said PbO being kept in suspension like a fluidized bed by a stirrer, drawing off from the fully oxidized $Pb_3O_4$ a quarter to half of the reactor contents and replacing the drawn off contents with new PbO.

2. The process according to claim 1, wherein the stirrer energy is used to keep the reaction at a temperature of about 470° to about 520° C.

3. A process according to claim 1, wherein the atmosphere in the fluidized bed is adjusted to a desired oxygen content of between 21 to 100%.

4. The process according to claim 3, wherein the oxygen content in the fluidized bed is adjusted by the oxygen content of the supplied gas.

5. The process according to claim 1 wherein, in the initial operation of the reactor, $Pb_3O_4$ is initially supplied and, after heating up to the temperature of about 470° to about 520° C., a quarter to half of the finished $Pb_3O_4$ is drawn off and then replaced by PbO to be oxidized and the drawing off of the $Pb_3O_4$ and the replacing by the new PbO are repeated.

6. The process according to claim 3, wherein, in the initial operation of the reactor, $Pb_3O_4$ is initially supplied and, after heating up to the temperature of about 470° to about 520° C., a quarter to half of the finished $Pb_3O_4$ is drawn off and then replaced by PbO to be oxidized and the drawing off of the $Pb_3O_4$ and the replacing by the new PbO are repeated.

7. The process according to claim 4, wherein, in the initial operation of the reactor, $Pb_3O_4$ is initially supplied and, after heating up to the temperature of about 470° to about 520° C., a quarter to half of the finished $Pb_3O_4$ is drawn off and then replaced by PbO to be oxidized and the drawing off of the $Pb_3O_4$ and the replacing by the new PbO are repeated.

8. The process of claim 1 wherein the $Pb_3O_4$ is withdrawn 20–40 minutes after addition of PbO.

9. The process of claim 5 wherein the $Pb_3O_4$ is withdrawn 20–40 minutes after addition of PbO.

10. The process of claim 6 wherein the $Pb_3O_4$ is withdrawn 20–40 minutes after addition of PbO.

11. The process of claim 7 wherein the $Pb_3O_4$ is withdrawn 20–40 minutes after addition of PbO.

\* \* \* \* \*